US006275209B1

(12) United States Patent
Yamamoto

(10) Patent No.: US 6,275,209 B1
(45) Date of Patent: Aug. 14, 2001

(54) LCD DRIVER

(75) Inventor: Yosuke Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/064,856

(22) Filed: Apr. 23, 1998

(30) Foreign Application Priority Data

Apr. 24, 1997 (JP) ..................................................... 9-107027

(51) Int. Cl.[7] ..................................................... G09B 3/36

(52) U.S. Cl. ............................. 345/95; 345/89; 345/210; 345/211

(58) Field of Search ................................. 345/95, 87, 89, 345/209, 210, 211, 52, 147, 77

(56) References Cited

U.S. PATENT DOCUMENTS

| | | | | |
|---|---|---|---|---|
| 5,745,092 | * | 4/1998 | Ito | 345/95 |
| 5,798,741 | * | 8/1998 | Kajihara | 345/95 |
| 5,986,649 | * | 11/1999 | Yamazaki | 345/95 |

* cited by examiner

*Primary Examiner*—Dennis-Doon Chow
(74) *Attorney, Agent, or Firm*—Arent Fox Kintner Plotkin & Kahn, PLLC

(57) ABSTRACT

An LCD driver does not require an extra step for contrast adjustment of an LCD in the assembly process of an appliance such as a portable phone that is fitted with an LCD; nor does it require the microcomputer to which it is connected to perform extra operations for contrast adjustment. This LCD driver drives a dot-matrix LCD in accordance with display data fed from a microcomputer, and includes a rewritable nonvolatile data-storage circuit for storing data concerning an electronic variable resistor for setting contrast of the LCD.

2 Claims, 6 Drawing Sheets

LCD DRIVER

BACKGROUND OF THE INVENTION

1. Field of the Invention

The present invention relates to an LCD driver for driving an LCD (liquid crystal display) in accordance with display data fed from a separately provided microcomputer, and particularly to an LCD driver for driving a dot-matrix LCD.

2. Description of the Prior Art

FIGS. 6A and 6B illustrate how a conventional LCD driver is used. As shown in FIG. 6A, a conventional LCD driver 73, when used in a portable phone or other appliance that incorporates a microcomputer 72 for controlling the entire appliance and an LCD 74, is placed between the microcomputer 72 and the LCD 74, so that the LCD driver 73, by being fed with display data from the microcomputer 72, drives the LCD 74.

Such an appliance is also provided with an nonvolatile data-storage device 71 such as an EEPROM (electrically erasable programmable read-only memory) for storing setting data so that a predetermined degree of contrast can be readily obtained in accordance with such factors as the type and use of the appliance. In the assembly process of the appliance, the contrast of the image displayed on the LCD 74 is adjusted to the desired degree, and the setting data for an electronic variable resistor at that time is stored in the data-storage device 71.

When this appliance is in actual use, the contrast of the LCD 74 is adjusted, as shown in FIG. 6B, by letting the microcomputer 72 read the setting data from the data-storage device 71 and feed it to the LCD driver 73. This helps prevent different LCDs 74 from exhibiting unduly different contrast as a result of variations in their characteristics that inevitably occur in their production.

However, storing the setting data for the electronic variable resistor in the data-storage device provided as a separate component requires the assembly process of the appliance such as a portable phone to include a step for adjusting the contrast of the display, that is, it necessitates an extra step in the assembly process. In addition, letting the microcomputer 72 read the setting data for the electronic variable resistor from the data-storage device 71 and feed it to the LCD driver 73 increases the operational burden to be borne by the microcomputer 72.

SUMMARY OF THE INVENTION

An object of the present invention is to provide an LCD driver that does not require an extra step for contrast adjustment in the assembly process of an appliance such as a portable phone that is fitted with an LCD. Another object of the present invention is to provide an LCD driver that does not require a microcomputer to perform extra operations for contrast adjustment.

To achieve the above objects, according to one aspect of the present invention, an LCD driver for driving a dot-matrix LCD in accordance with display data fed from a microcomputer is provided with a rewritable nonvolatile data-storage circuit for storing data concerning an electronic variable resistor for setting the contrast of the LCD.

With this LCD driver, it is only after the LCD to be driven has been determined that contrast is adjusted and the setting data for the electronic variable resistor is stored in the nonvolatile data-storage circuit of the LCD driver. As a result, it is no longer necessary to adjust contrast while an appliance such as a portable phone is assembled from components including the LCD driver and the microcomputer. Nor is it necessary to provide as a separate component a data-storage device for storing the setting data for the electronic variable resistor.

In this LCD driver, the above-mentioned nonvolatile data-storage circuit may be realized as an EEPROM. In that case, it is possible, when the LCD driver is manufactured, to integrate the EEPROM readily into the same chip as the LCD driver simply by slightly modifying the manufacturing process of CMOS (complementary metal-oxide semiconductor). In addition, it is also possible to use the voltage step-up circuit provided in the LCD driver both for driving the LCD and for effecting the writing of data to the EEPROM.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
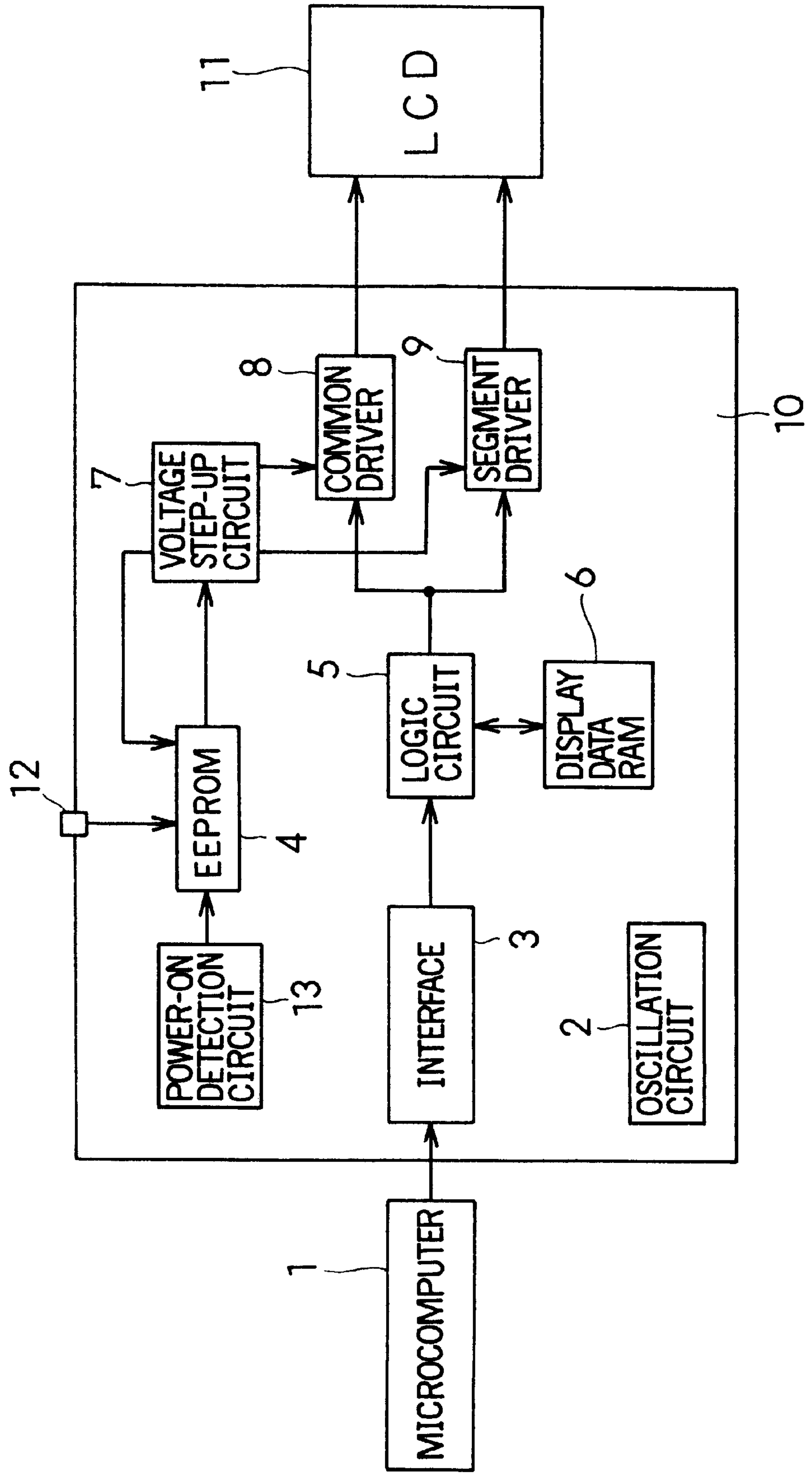
FIG. 1 is a diagram showing the construction of an LCD driver embodying the invention.

Hereinafter, an embodiment of the present invention will be described with reference to FIGS. 1 to 5. FIG. 1 is a block diagram illustrating the construction of an LCD driver 10 embodying the invention and the data flow therein. The LCD driver 10 is connected to a microcomputer 1 and to an LCD 11.

In an appliance such as a portable phone, the microcomputer 1 controls the entire appliance, and it also controls the LCD driver 10, by feeding it with data in accordance with signals fed from switches (not shown) for example, so that the LCD driver 10 drives the LCD 11 to effect display. The LCD driver 10 is formed on a single chip as a separate unit from the microcomputer 1. The LCD 11 is a dot-matrix LCD capable of black-and-while display, and the contrast of each of its dots depends on the voltage of the signal that is fed from the LCD driver 10 to turn on that dot.

When the microcomputer 1 sends out display data, the LCD driver 10 receives it via an interface 3 provided therein. The received display data is then processed by a logic circuit 5 composed of decoders, registers, and the like, and is then stored in a display data RAM (random access memory) 6.

While the LCD driver 10 is performing its own processing, it keeps outputting a busy flag to the microcomputer 1.

In accordance with the display data stored in the RAM 6, a segment driver 9 produces signals that have waveforms as described later. On the other hand, a common driver produces signals having predetermined waveforms at regular intervals. The signals outputted from the common driver 8 and the segment driver 9 are fed to the LCD 11. The common driver 8 and the segment driver 9 receive a voltage from a voltage step-up circuit.

The LCD driver 10 is provided with an input terminal 12 for receiving setting data for an electronic variable resistor that is to be fed to an EEPROM 4. Here, the "electronic variable resistor" refers to the circuit for varying for contrast adjustment the voltage used as a reference with respect to which the voltage supplied from the voltage step-up circuit to the common driver 8 and the segment driver 9 is determined. The received setting data is stored in the EEPROM 4 that is provided within the LCD driver 10.

The LCD driver 10 also has a power-on detection circuit 13 for detecting the presence of supplied power by means of a switching device for example, so that the LCD driver 10, when turned on, can send a signal to the EEPROM 4. This signal causes the setting data for the electronic variable resistor stored in the EEPROM 4 to be fed to the voltage step-up circuit 7, which then supplies the common driver 8 and the segment driver 9 with a voltage that is determined in accordance with the received setting data. The voltage obtained from the voltage step-up circuit 7 is used also to erase the data stored in the EEPROM 4.

With the LCD driver 10 of this embodiment, it is possible to adjust contrast and store the setting data for the electronic variable resistor in the EEPROM 4 as soon as a decision has been made as to the model of the LCD 11 with which the LCD driver 10 is to be combined to produce an LCD module or the like. This eliminates the need to transfer the setting data from the microcomputer to the LCD driver as with the conventional LCD driver 73 (see FIGS. 6A and 6B). The setting data for the electronic variable resistor consists of six bits for example, in which case contrast can be adjusted in 64 steps of gradation. The LCD driver 10 also has an oscillation circuit 2 for producing display-synchronizing and other signals.

Figure 2:
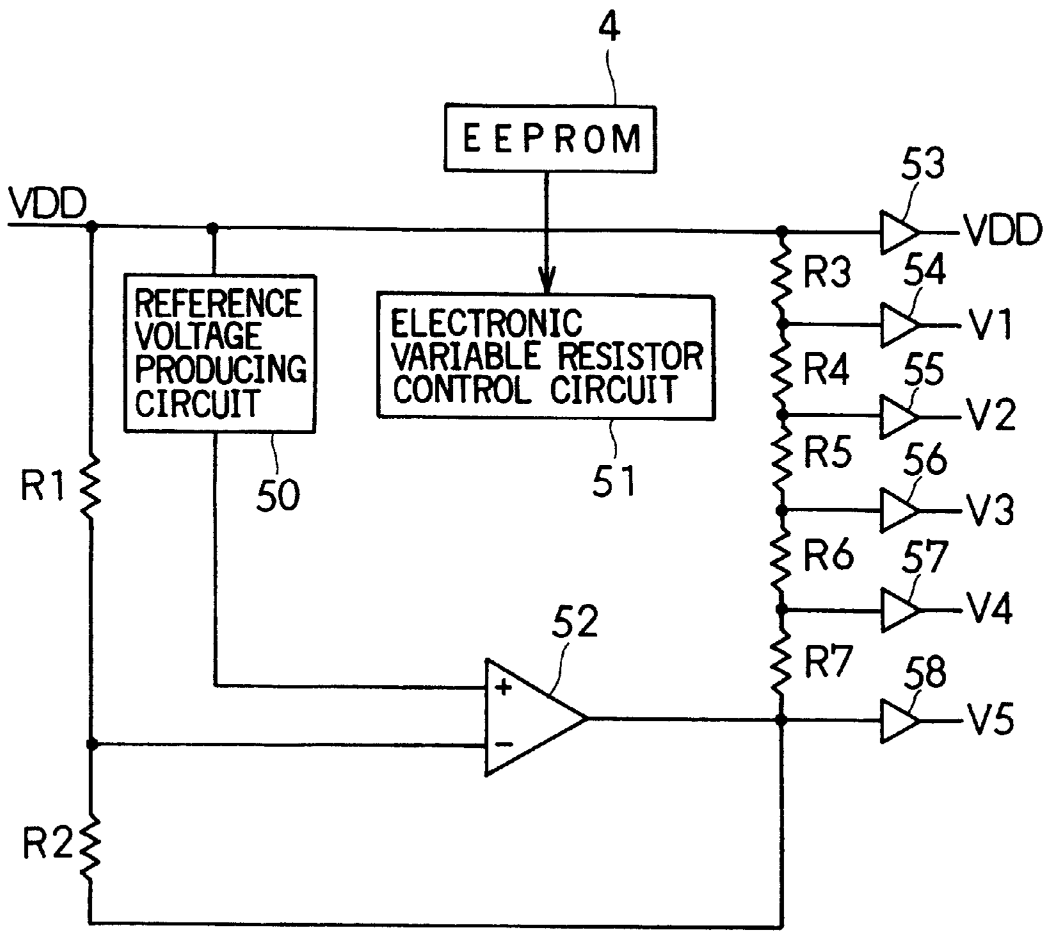
FIG. 2 is a circuit diagram of the portion around the voltage step-up circuit of the LCD driver of the invention.

FIG. 2 shows a circuit diagram of an example of the voltage step-up circuit 7. The setting data for the electronic variable resistor is fed from the EEPROM 4 to an electronic variable resistor control circuit 51, which controls the voltage produced by a reference voltage producing circuit 50. An operational amplifier 52 has its non-inverting input terminal (+) connected through the reference voltage producing circuit 50 to a power source voltage VDD, and has its inverting input terminal (−) connected through a resistor R1 to the power source voltage VDD. The operational amplifier 52 has its output terminal connected through a resistor R2 to its inverting input terminal (−), thereby to achieve feedback.

Between the output terminal of the operational amplifier 52 and the power source voltage VDD, resistors R3, R4, . . . , R7 are connected in series. From the individual junctions between the resistors R3, R4, . . . , R7, voltages V1, V2, V3, and V4 are extracted through buffers 54, 55, 56, and 57, respectively. In addition, the voltage step-up circuit 7 also outputs the power source voltage VDD through a buffer 53, and outputs the output of the operational amplifier 52 through a buffer 58 as a voltage V5. In this way, in accordance with the setting data stored in the EEPROM 4, the voltage step-up circuit 7 outputs voltages V1 to V5 in five steps to the common driver 8 and the segment driver 9.

Figure 3:
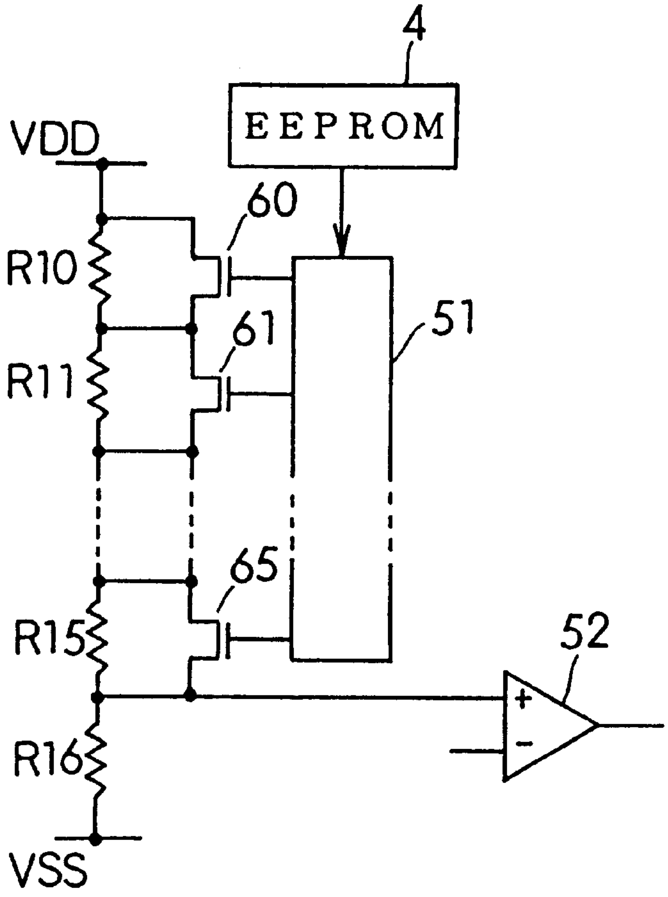
FIG. 3 is a circuit diagram of the portion around the reference voltage producing circuit of the LCD driver of the invention.

Next, a description will be given as to how a reference voltage is produced in the reference voltage producing circuit 50. FIG. 3 shows a circuit diagram of an example of the portion around the reference voltage producing circuit 50. Between the power source voltages VDD and VSS, seven resistors R10, R11, . . . , R16 are connected in series, with the junction between the resistors R15 and R16 connected to the non-inverting input terminal (+) of the operational amplifier 52. In addition, six FETs (field-effect transistors) 60 to 65 are connected individually in parallel with the resistors R10 to R15, respectively.

The FETs 60 to 65 have their gate connected to the electronic variable resistor control circuit 51 so that the former will be turned on and off by the latter. The resistors R10 to R15 have different resistances so that, as the FETs 60 to 65 are individually switched between the on and off states, the operational amplifier 52 will receive varying voltages. Stored in the EEPROM 4 is data that indicates whether the individual FETs 60 to 65 are in the on or off state.

Figure 4:
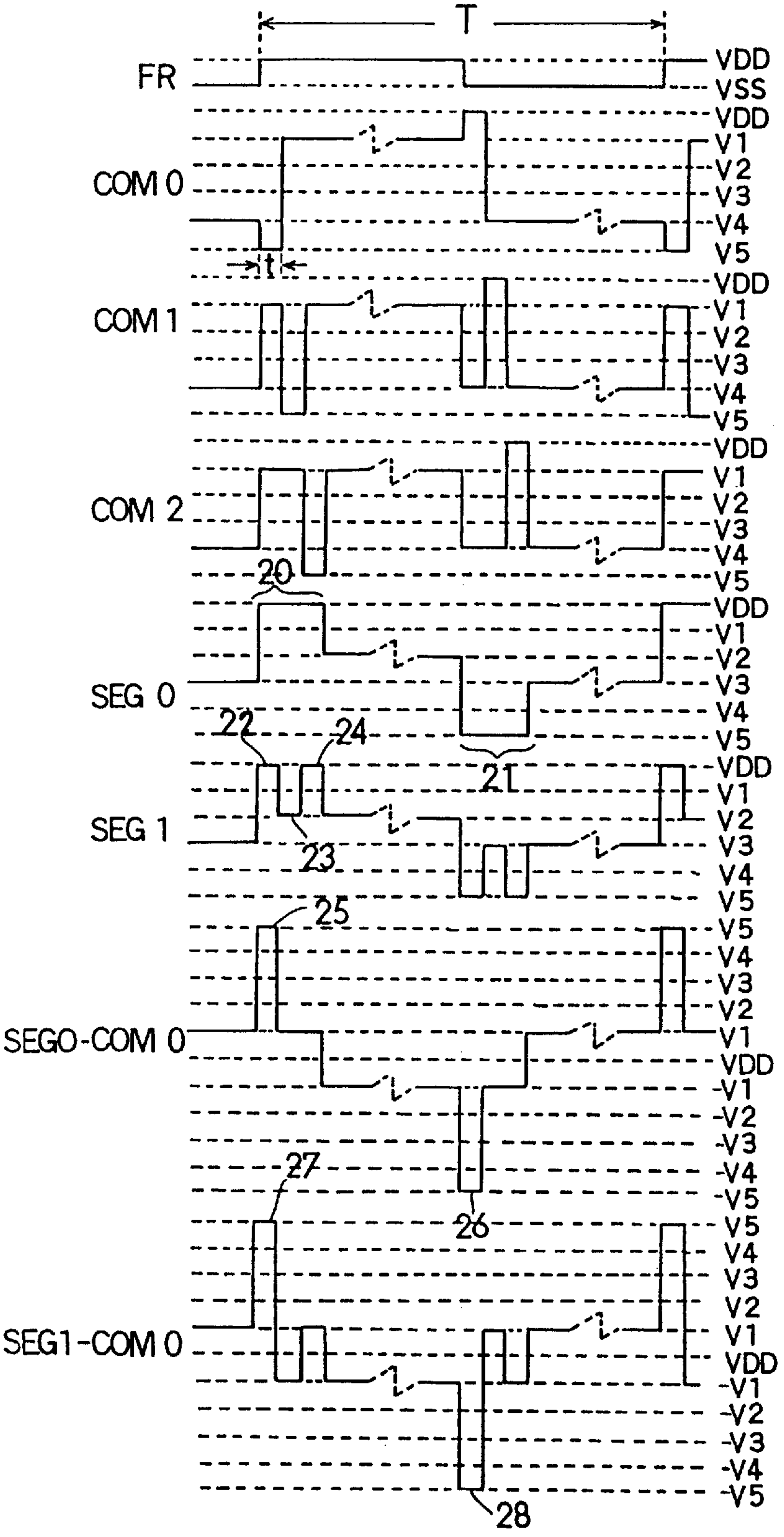
FIG. 4 is a diagram showing examples of the waveforms of the signals outputted from the LCD driver of the invention.
Figure 5:
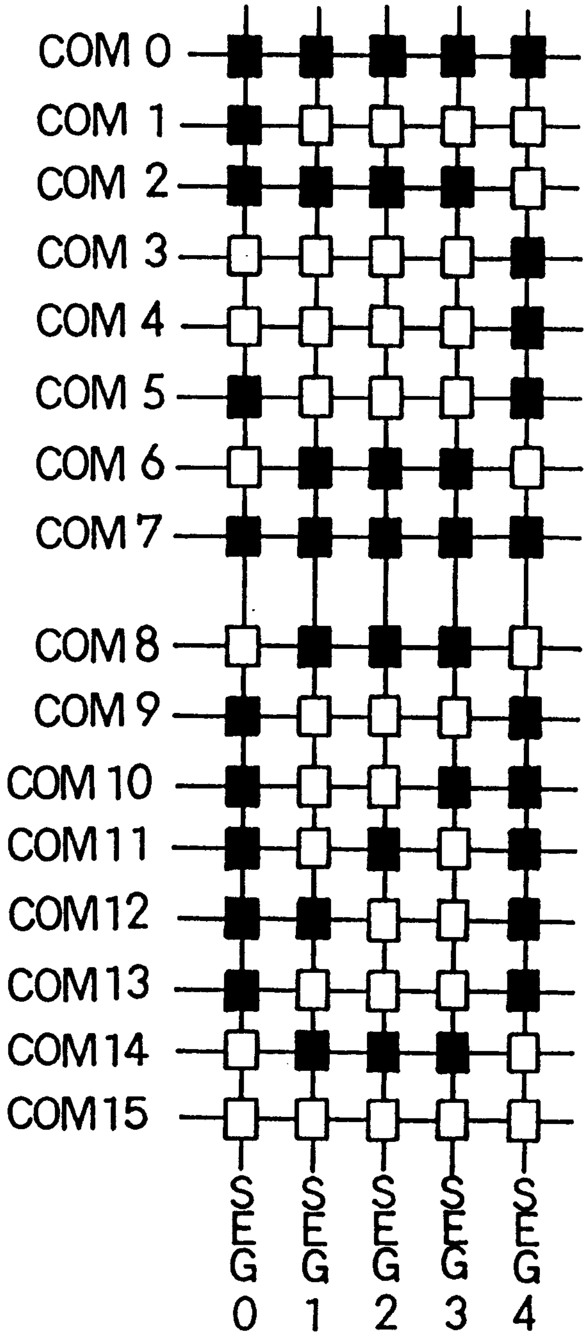
FIG. 5 is a diagram showing a pattern displayed on an LCD driven by the LCD driver of the invention in accordance with the signals as shown in FIG. 4.

The LCD driver 10 drives the LCD 11 by line-sequential scanning. FIG. 4 shows examples of the waveforms of the signals that the common driver 8 and the segment driver 9 output by use of the power source voltage VDD as well as the voltages V1 to V5 outputted from the voltage step-up circuit 7. When these signals have the waveforms as shown in FIG. 4, they display the pattern as shown in FIG. 5 on a part of the LCD 11. The signal FR is a signal with a period T outputted from the oscillation circuit 2, and is used as a display-synchronizing signal.

COM0, COM1, . . . represent signals outputted from the common driver 8; SEG0, SEG1, . . . represent signals outputted from the segment driver 9. SEG0–COM0 represents the voltage that is applied to the intersection between SEG0 and COM0 of the LCD 11; SEG1–COM0 represents the voltage that is applied to the intersection between SEG1 and COM0 of the LCD 11. In FIG. 4, the power source voltage VDD is assumed to be equal to the reference level (0 V).

COM0, COM1, . . . are outputted from the common driver 8 with a period T, each having a waveform with selection points delayed by a length of time t relative to the previous one. SEG0, SEG1, . . . vary with the pattern displayed. For example, in the period 20. SEG0 equals the power source voltage VDD, and this corresponds to the fact that those points where SEGO intersects COM0, COM1, and COM2 are turned on to form a display pattern in FIG. 5; in the period 21, SEG0 equals the voltage V5, and thus it exhibits a symmetrical waveform. In the period 22, SEG1 equals the power source voltage VDD; in the next period 23, it equals the voltage V2; in the next period 24, it equals the power source voltage VDD.

As a result, as indicated by the waveform of SEG0–COM0, the intersection between SEG0 and COM0 receives the voltage V5 in the period 25, and thereafter receives voltages varying in the vicinity of the voltage VDD; it receives a voltage −V5 in the period 26, and thereafter again receives voltages varying in the vicinity of the voltage VDD. This waveform is repeated with a period T as long as there is no change in the displayed pattern. Every half the period, this intersection is selected with the polarity of the voltage applied thereto inverted every time. This is to prevent deterioration of the liquid crystal of the LCD 11 by canceling the direct-current components contained in the voltage applied thereto.

The intersection between SEG1 and COM0 (as indicated by SEG1–COM0) receives the voltage V5 in the period 27, and thereafter receives voltages varying in the vicinity of voltage VDD: it receives the voltage −V5 in the period 28, and thereafter again receives voltages varying in the vicinity of VDD. This intersection is also turned on like the intersection between SEG0 and COM0. Although not shown in the figure, a dot that is not turned on such as the intersection between SEG1 and COM1 does not receive neither the voltage V5 or the voltage −V5, as will be clear when SEG1–COM1 is calculated from the above-mentioned SEG1 and COM1. In this way, every intersection is selected once within every period T.

As described above, in this embodiment, when the LCD driver 10 starts receiving power, the voltages V1 to V5 outputted from the voltage step-up circuit 7 are set in accordance with the setting data for the electronic variable resistor stored in the EEPROM 4, and, in accordance with those voltages V1 to V5, the voltage of the signal supplied from the common driver 8 and the segment driver 9 to the LCD 11. In this way, the contrast of the LCD 11 is adjusted.

Figure 6A:
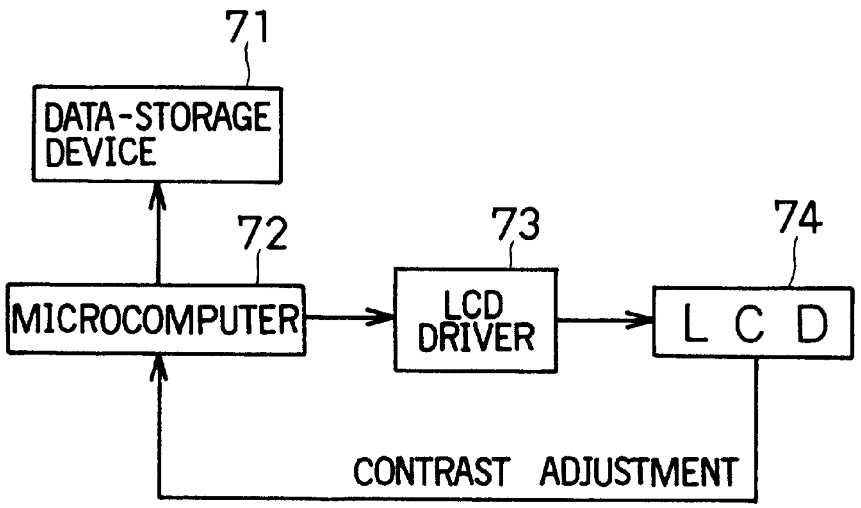
FIG.6A PRIOR ART
FIG. 6A is a diagram showing the construction of an appliance that employs a conventional LCD driver and the flow of data and instructions in its manufacturing process.
Figure 6B:
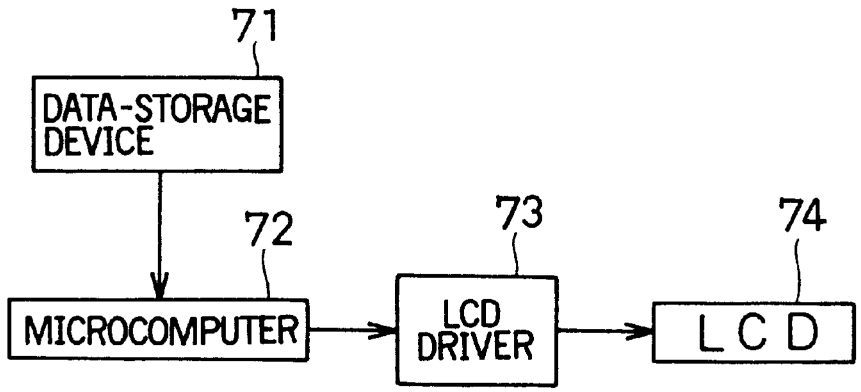
FIG.6B PRIOR ART
FIG. 6B is a diagram showing the construction of the appliance that employs the conventional LCD driver and the flow of data and instructions in its actual use.

Thus, there is no need to feed the setting data for the electronic variable resistor from the microcomputer 1 to the LCD driver 10, and this helps reduce the operational burden to be borne by the microcomputer 1 a s compared with the conventional LCD driver 73 (see FIGS. 6A and 6B). Moreover, since it is possible to adjust contrast beforehand as soon as the LCD driver 10 is combined with a specific model of the LCD 11 to produce an LCD module, it is not necessary to adjust contrast when an appliance such as a portable phone i s assembled from components including such an LCD module and a microcomputer 1. Even in case it is necessary to adjust contrast, the setting data can be fed to the LCD driver 10 via the terminal 12.

Furthermore, whereas the conventional LCD driver 73, as shown in FIGS. 6A and 6B. requires a data-storage device 71 for storing the setting data for the electronic variable resistor, the LCD driver 10 of this embodiment does not need any. This helps reduce the scale of the circuit as a whole, and thus contributes to the miniaturization of appliances such as portable phones. The voltage step-up circuit 7 is used not only for the common driver 8 and the segment driver 9, but also for rewriting the data stored in the EEPROM 4. This makes efficient use of the circuit components possible, and thus prevents the circuit from becoming unduly large. The EEPROM 4 can readily be integrated into the same chip as the LCD driver simply by slightly modifying the manufacturing process of CMOS.

Note that the setting data may be outputted from the EEPROM 4 any time other than when the LCD driver is turned on; for example, it may be outputted when display is started in accordance with the data fed from the microcomputer 1. Note also that, although the voltage step-up circuit 7 outputs voltages V1 to V5 in five steps in the above-described embodiment as shown in FIG. 2, the voltages may be outputted in any number of steps other than five. In that case, the signals outputted from the common driver 8 and the segment driver 9 will naturally exhibit waveforms different from those shown in FIG. 4.

Moreover, although the reference voltage producing circuit 50 achieves voltage division by use of resistors in the example shown in FIG. 3, it is also possible to use, for example, voltage-regulating diodes or voltage-regulating circuits for the same purpose. On the other hand, the EEPROM 4 may be replaced with a rewritable nonvolatile memory such as a ferroelectric memory. The setting data for the electronic variable resistor may consist of any number of bits other than six in accordance with the number of actually required steps of gradation.

As described above, according to the present invention, an LCD driver is provided with a nonvolatile data-storage circuit for storing setting data for an electronic variable resistor. As a result, it is possible to adjust contrast as soon as the LCD driver is combined with an LCD to produce an LCD module. This eliminates the need to adjust contrast when an appliance such as a portable phone is assembled. Moreover, it is not necessary to provide as a separate component a data-storage device for storing the above setting data. This helps reduce the circuit scale, and thus contributes to the miniaturization of appliances such as portable phones. Furthermore, it is no longer necessary to feed the contrast setting data from a microcomputer to the LCD driver. This helps reduce the operational burden to be borne by the microcomputer.

In addition, when the LCD driver is manufactured, it is possible to integrate an EEPROM readily into the same chip as the LCD driver simply by slightly modifying the manufacturing process of CMOS. The EEPROM can, as a voltage step-up circuit it needs for the rewriting of data, use the voltage step-up circuit provided in the LCD driver. This makes efficient use of the circuit components possible.

Obviously, many modifications and variations of the present invention are possible in light of the above teachings. It is therefore to be understood that within the scope of the appended claims, the invention may be practiced other than as specifically described.

What is claimed is:

1. A liquid crystal display driver comprising:

reference voltage producing means for producing a variable reference voltage from two predetermined voltages;

driving voltage producing means for producing from a predetermined voltage and said reference voltage a plurality of driving voltages to be supplied to a liquid crystal display;

data-storage means for storing data that represents a voltage to which said reference voltage is to be set;

control means for controlling said reference voltage producing means to set said reference voltage to the voltage represented by said data; and wherein said reference voltage producing means comprises:

a first resistor of which a first end is connected to the lower one of said two predetermined voltages;

a plurality of resistors that are connected in series between the higher one of said two predetermined voltages and a second end of said first resistor;

a plurality of switching devices that are connected individually in parallel with said plurality of resistors, said reference voltage appearing at the second end of said first resistor, and wherein said control means sets said reference voltage to the voltage represented by said data by controlling said plurality of switching devices individually between conducting and non-conducting states in accordance with said data.

2. A liquid crystal display driver comprising:

reference voltage producing means for producing a variable reference voltage from two predetermined voltages;

driving voltage producing means for producing from a predetermined voltage and said reference voltage a plurality of driving voltages to be supplied to a liquid crystal display;

data-storage means for storing data that represents a voltage to which said reference voltage is to be set;

control means for controlling said reference voltage producing means to set said reference voltage to the voltage represented by said data; and wherein said reference voltage producing means comprises:

a first resistor of which a first end is connected to the lower one of said two predetermined voltages;

a plurality of resistors that are connected in series between the higher one of said two predetermined voltages and a second end of said first resistor;

a plurality of switching devices that are connected individually in parallel with said plurality of resistors, said reference voltage appearing at the second end of said first resistor, and wherein said control means sets said reference voltage to the voltage represented by said data by controlling said plurality of switching devices individually between conducting and non-conducting states in accordance with said data, and wherein said data represents the voltage to which said reference voltage is to be set by specifying whether said plurality of switching devices are individually to be brought into a conducting or non-conducting state.

* * * * *